(12) United States Patent
Del Sesto et al.

(10) Patent No.: US 11,393,353 B2
(45) Date of Patent: Jul. 19, 2022

(54) INDUSTRIAL OPERATIONS SECURITY TRAINING SYSTEMS AND METHODS

(71) Applicant: UI LABS, Chicago, IL (US)

(72) Inventors: Antonio Del Sesto, Chicago, IL (US); Rodrigo Santos Quintella Freire, Chicago, IL (US); Alejandro Velez, Park Ridge, IL (US)

(73) Assignee: UI LABS, Chicago, IL (US)

( * ) Notice: Subject to any disclaimer, the term of this patent is extended or adjusted under 35 U.S.C. 154(b) by 0 days.

(21) Appl. No.: 17/039,540

(22) Filed: Sep. 30, 2020

(65) Prior Publication Data

US 2022/0101742 A1    Mar. 31, 2022

(51) Int. Cl.
*G09B 19/00* (2006.01)
*G09B 5/06* (2006.01)
*G09B 9/00* (2006.01)

(52) U.S. Cl.
CPC .................. *G09B 5/06* (2013.01); *G09B 9/00* (2013.01); *G09B 19/0053* (2013.01)

(58) Field of Classification Search
CPC ......... G09B 5/06; G09B 9/00; G09B 19/0053
See application file for complete search history.

(56) References Cited

U.S. PATENT DOCUMENTS

| | | | |
|---|---|---|---|
| 4,613,952 A * | 9/1986 | McClanahan | G09B 9/00 434/118 |
| 7,808,447 B1 | 10/2010 | Cook | |
| 8,235,335 B2 | 8/2012 | Sato et al. | |
| 8,595,831 B2 | 11/2013 | Skare | |
| 8,977,526 B1 | 3/2015 | Jedlowski et al. | |
| 10,409,542 B2 | 9/2019 | Huang et al. | |
| 2003/0054329 A1* | 3/2003 | Springett | G09B 25/00 434/373 |
| 2008/0064013 A1 | 3/2008 | Quimper et al. | |
| 2009/0271169 A1 | 10/2009 | Minto et al. | |
| 2009/0320137 A1* | 12/2009 | White | G06F 21/577 707/999.102 |
| 2012/0122062 A1* | 5/2012 | Yang | G09B 19/003 434/219 |
| 2012/0221308 A1 | 8/2012 | Chen | |
| 2017/0140660 A1* | 5/2017 | Morton | H04L 67/38 |
| 2018/0267681 A1 | 9/2018 | Epstein | |
| 2018/0374379 A1* | 12/2018 | Nappa | G09B 19/0053 |
| 2020/0135049 A1* | 4/2020 | Atencio | G09B 19/0053 |

\* cited by examiner

*Primary Examiner* — Peter R Egloff
(74) *Attorney, Agent, or Firm* — Lempia Summerfield Katz LLC

(57) ABSTRACT

An industrial operations network is disclosed herein. More particularly the disclosure may pertain to an industrial operations network designed for facilitating the training of security concepts for industrial operations. In one embodiment, an apparatus for training industrial security concepts is disclosed. The apparatus may comprise a portable industrial operations network comprising: at least one router; at least one firewall; at least one programmable logic controller; and at least one display connected to the portable industrial operations network, said at least one display adapted to display, at different times, normal operating conditions of said portable industrial operations network and security fault conditions in said portable industrial operations network.

18 Claims, 5 Drawing Sheets

INDUSTRIAL OPERATIONS SECURITY TRAINING SYSTEMS AND METHODS

GOVERNMENT LICENSE RIGHTS

This invention was made with government support under Contract No. W15QKN1930003 awarded by the U.S. Army Contracting Command. The government has certain rights in the invention.

FIELD

The present disclosure pertains to an industrial operations network and more particularly pertains to an industrial operations network designed for facilitating the training of security concepts for industrial operations.

BACKGROUND

Industrial operations networks are key components of the modern manufacturing economy. They are found in nearly every major manufacturing facility and perform important functions, coordinating instructions reporting in connection with the operation of industrial control apparatus such as programmable logic controllers (PLCs), which in turn control manufacturing equipment.

Like any computer network, industrial operations networks are vulnerable to attacks and hacks, and also to poor security practices and malfunctions. In the manufacturing world today, it is critical that personnel involved with manufacturing be aware of these vulnerabilities. But training such personnel can be difficult, in part because it may require trainees to be brought into industrial environments to understand how to detect and address vulnerabilities.

There exists a need for systems and methods that exhibit security vulnerabilities that industrial operations networks are subject to, and that do so in a portable way so that trainees can be trained on these concepts in a convenient and cost-effective way.

SUMMARY

An aspect of the disclosure provides an apparatus for training industrial security concepts. The apparatus may comprise a portable industrial operations network comprising: at least one router; at least one firewall; at least one programmable logic controller; and at least one display connected to the portable industrial operations network, said at least one display adapted to display, at different times, normal operating conditions of said portable industrial operations network and security fault conditions in said portable industrial operations network.

An alternative aspect of the disclosure provides a method for operating an apparatus for training industrial security concepts. The method may comprise providing a portable industrial operations network comprising at least one router, at least one firewall, at least one programmable logic controller, and at least one display connected to the portable industrial operations network, said at least one display adapted to display, at different times, normal operating conditions of said portable industrial operations network and security fault conditions in said portable industrial operations network; and executing training programs using said portable industrial operations network to conduct a training program demonstrating at least one security exploit occurring on the portable industrial operations network.

An alternative aspect of this disclosure provides an apparatus for training industrial security concepts comprising: a portable industrial operations network comprising; at least one router; at least one firewall; at least one programmable logic controller; at least one display connected to the portable industrial operations network, said at least one display adapted to display, at different times, normal operating conditions of said portable industrial operations network and security fault conditions in said portable industrial operations network; a frame in which the at least one router, at least one firewall, at least one programmable logic controller are disposed, and at least one display are connected; and at least one hinge to which the at least one display is mounted to said frame, said at least one hinge allowing the at least one display to be deployed from a stowed position to a displayed position.

DETAILED DESCRIPTION

Systems and methods of the present invention provide an industrial operations network that exhibits important operational characteristics of a fully deployed on-site industrial operations network as found in a manufacturing facility, in a portable and self-contained form factor.

Figure 1:
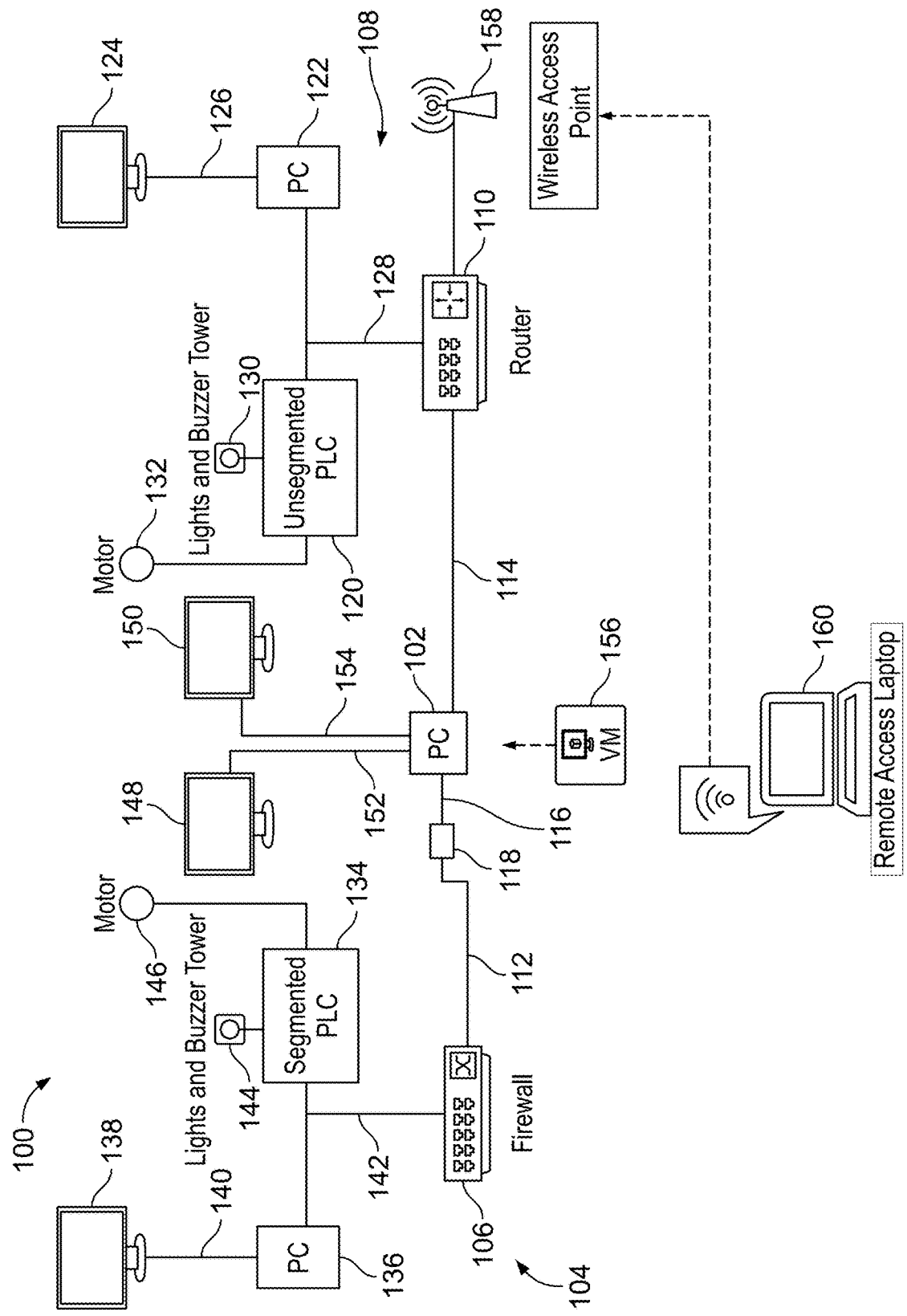
FIG. 1 shows a block diagram showing the active hardware used in an industrial operations network.

FIG. 1 is a block diagram showing the active hardware used in an industrial operations network 100 according to one embodiment of the present invention. In one embodiment of the present invention, the hardware provided in the industrial operations network 100 is hardware that is substantially identical to that which would be utilized in an industrial operations network at a factory site, so that training occurs on essentially the same hardware that will be found in factory environments.

The industrial operations network comprises a central PC 102 that serves as the logical hub of the industrial operations network 100, relaying signals between components of the industrial operations network 100 just as it would if deployed in a factory environment. In one embodiment the central PC 102 (along with other PCs in the industrial operations network) is a small-form-factor PC such as the NUC PC available from Intel. The PCs may be provided with USB sockets, so that USB drives (and possibly other components) can be attached to the PCs for the purposes of training as further discussed herein.

The central PC 102 is connected to a segmented portion 104 of the industrial operations network 100, logically placed behind a firewall 106, and an unsegmented portion 108 of the industrial operations network 100 without an intermediary firewall between the central PC 102 and the unsegmented portion 108. In addition to the use of the firewall 106, there may be other differences between segmented and unsegmented hardware in embodiments of the present invention. For example, segmented hardware may have other security elements in place (such as lacking code vulnerabilities that would allow PLC exploits) in addition to simply being behind the firewall 106.

A router 110 connects the central PC 102 to other unsegmented elements of the industrial operations network 100. The connections between the central PC 102 and the segmented portion 104 and the unsegmented portion 108 are made via data cables 112 and 114, which may be ethernet cables. The connection to one or both sides may be initially made via USB cable 116 with the use of a USB-to-ethernet adapter 118.

For communicating with the unsegmented portion 108 of the industrial operations network 100, the central PC is connected through the router 110 to an unsegmented programmable logic controller (PLC) 120 and an unsegmented section PC 122. The unsegmented section PC 122, in turn, is connected to an unsegmented display 124 via a display cable 126 such as (for example) an HDMI cable. In one embodiment of the present invention, the programmable logic controllers are Productivity 1000 PLCs, though it is to be understood that other PLCs may be used in some embodiments of the invention.

The connections between the router 110, the unsegmented programmable logic controller (PLC) 120, and the unsegmented section PC 122 may be made via data cables 128 such as ethernet cables, and a switch may be provided to facilitate connections as needed.

The unsegmented programmable logic controller 120 is connected to indicators and/or operating components and is adapted to activate those indicators in response to certain conditions detected by the unsegmented programmable logic controller 120. In the embodiment shown in FIG. 1, the unsegmented programmable logic controller 120 is connected to a light-and-buzzer tower 130 and a motor 132. The functions of the light-and-buzzer tower 130 and motor 132 will be explained in further detail below with reference to the operation of the industrial operations network 100.

Returning to the central PC 102, it is connected to the segmented portion 104 of the industrial operations network 100 through the firewall 106 to a segmented programmable logic controller (PLC) 134 and a segmented section PC 136. The segmented section PC 136, in turn, is connected to a segmented display 138 via a display cable 140 such as (for example) an HDMI cable.

The connections between the firewall 106, the segmented programmable logic controller (PLC) 134, and the segmented section PC 136 may be made via data cables 142 such as ethernet cables, and a switch may be provided to facilitate connections as needed.

The segmented programmable logic controller 134 is connected to indicators and/or operating components and is adapted to activate those indicators in response to certain conditions detected by the segmented programmable logic controller 134. In the embodiment shown in FIG. 1, the segmented programmable logic controller 134 is connected to a segmented light-and-buzzer tower 144 and a segmented motor 146. The functions of the segmented light-and-buzzer tower 144 and the segmented motor 146 will be explained in further detail below with reference to the operation of the industrial operations network 100.

The light-and-buzzer towers 130 and 144 are, in one embodiment, provided with a green light, a red light, and an audible siren or buzzer, which can be used in combination to indicate different states of the industrial operations network 100 as further explained below. The motors 132 and 146, in one embodiment, result in a visible spinning motion that may be used to show proper or improper operation of the industrial operations network 100.

The central PC 102 is also connected to central displays 148 and 150 via display cables 152 and 154, such as HDMI cables. The central displays 148 and 150 can be used to display operation information about the industrial operations network 100. In one embodiment of the invention, displays used are substantially identical to one another and measure 13 inches on the diagonal.

The central PC 102 may be configured to instantiate a Linux virtual machine 156 (using, for example, the Ubuntu 20.04 operating system), which can serve as the central control unit of the industrial operations network 100.

Also connected to the industrial operations network 100 may be a wireless access point 158, which enables communication with wireless devices such as a remote access laptop 160. It is to be understood that connections within the industrial operations network 100, and especially data connections, may be either wireless or wired connections, according to different embodiments of the present invention. In one embodiment, the firewall 106 is implemented with the same or similar hardware as the router 110 with firewall capability enabled via configuration settings, but it is to be understood that that the functionality of the hardware and/or firmware of the firewall 106 and router 110 may be implemented using a variety of types of hardware, software, and firmware.

Figure 2:
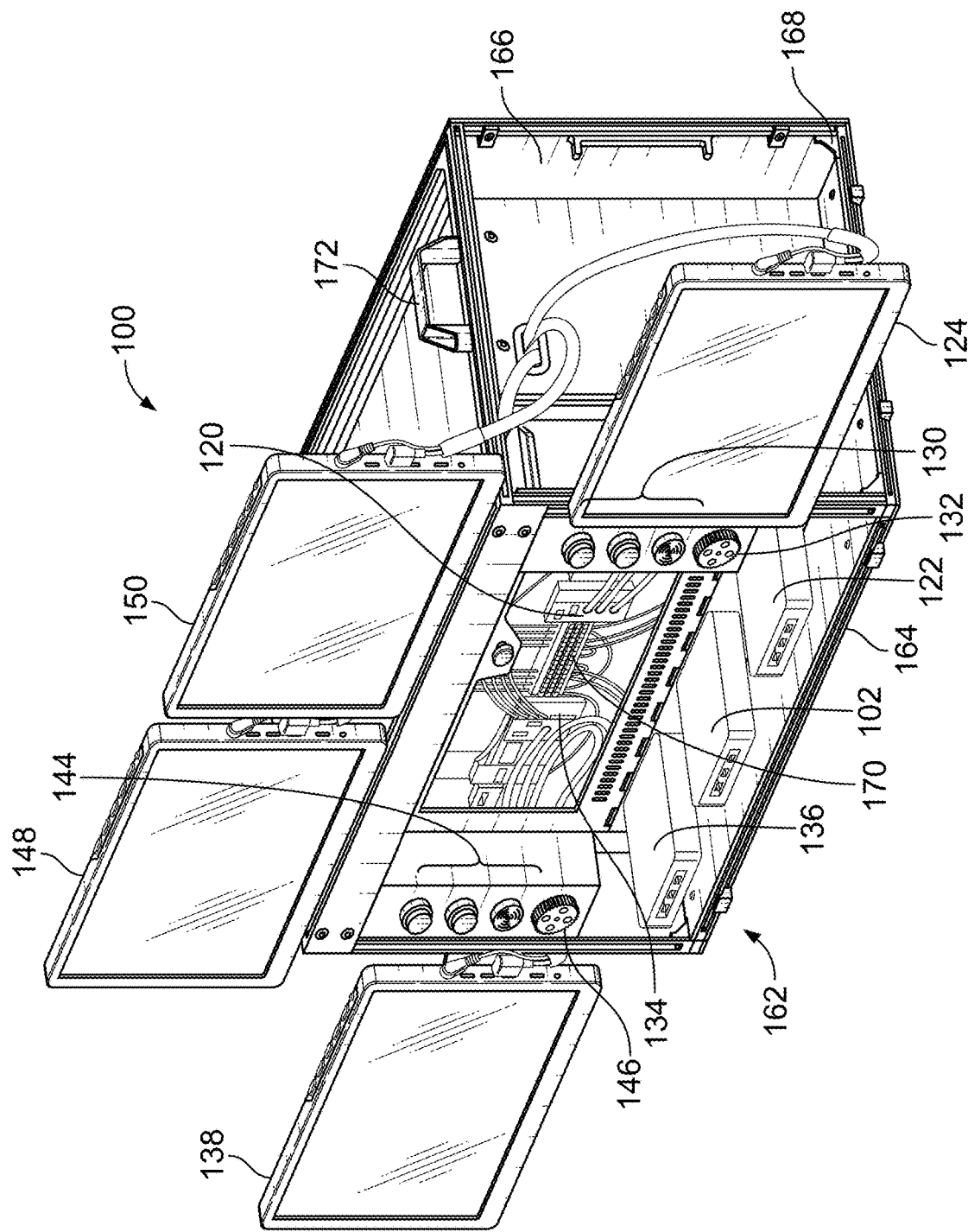
FIG. 2 shows one configuration of one embodiment of an industrial operations network.
Figure 4:
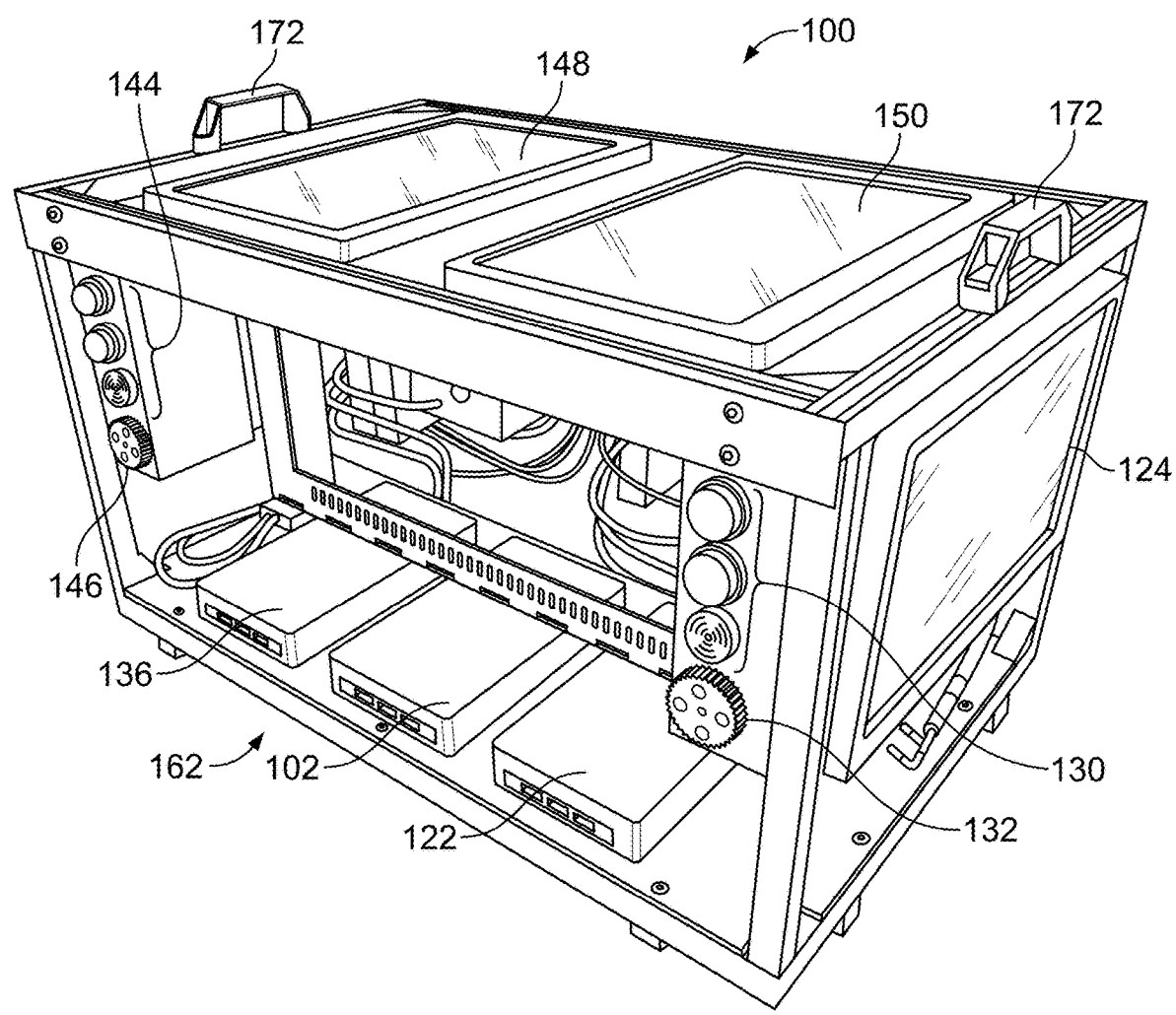
FIG. 4 shows a perspective view of an industrial operations network showing the network collapsed for portability.

Turning to FIG. 2, a configuration of one embodiment of the industrial operations network 100 of the present invention is shown with the displays 124, 138, 148, and 150 in deployed positions. The hardware of the industrial operations network 100 is provided in a frame 162, which is constructed of struts 164, panels 166, and connecting hardware such as corner connectors 168. The displays may be moved between a deployed position as shown in FIG. 2 and a stowed position as shown in FIG. 4 via the use of mounts that support the displays in either position.

Visible at the front of the industrial operations network 100 in FIG. 2 are the central PC 102, the unsegmented PC 122, and the segmented PC 136. Also visible are the unsegmented PLC 120 and the segmented PLC 134. The unsegmented lights and buzzer tower 130 and the unsegmented motor 132 are shown toward the right side of the industrial operations network 100. The segmented lights and buzzer tower 144 and the segmented motor 146 are shown toward the left side of the industrial operations network 100. Power distribution hardware 170, which may be mounted on a DIN rail, is shown centrally located within the industrial operations network 100. Additional hardware, such as air circulation fans to facilitate cooling of the industrial operations network 100, may be mounted within the frame 162.

The industrial operations network 100 in the embodiment of FIG. 2 is designed to be self-contained and portable. Handles 172 may be provided for portability purposes.

Figure 3:
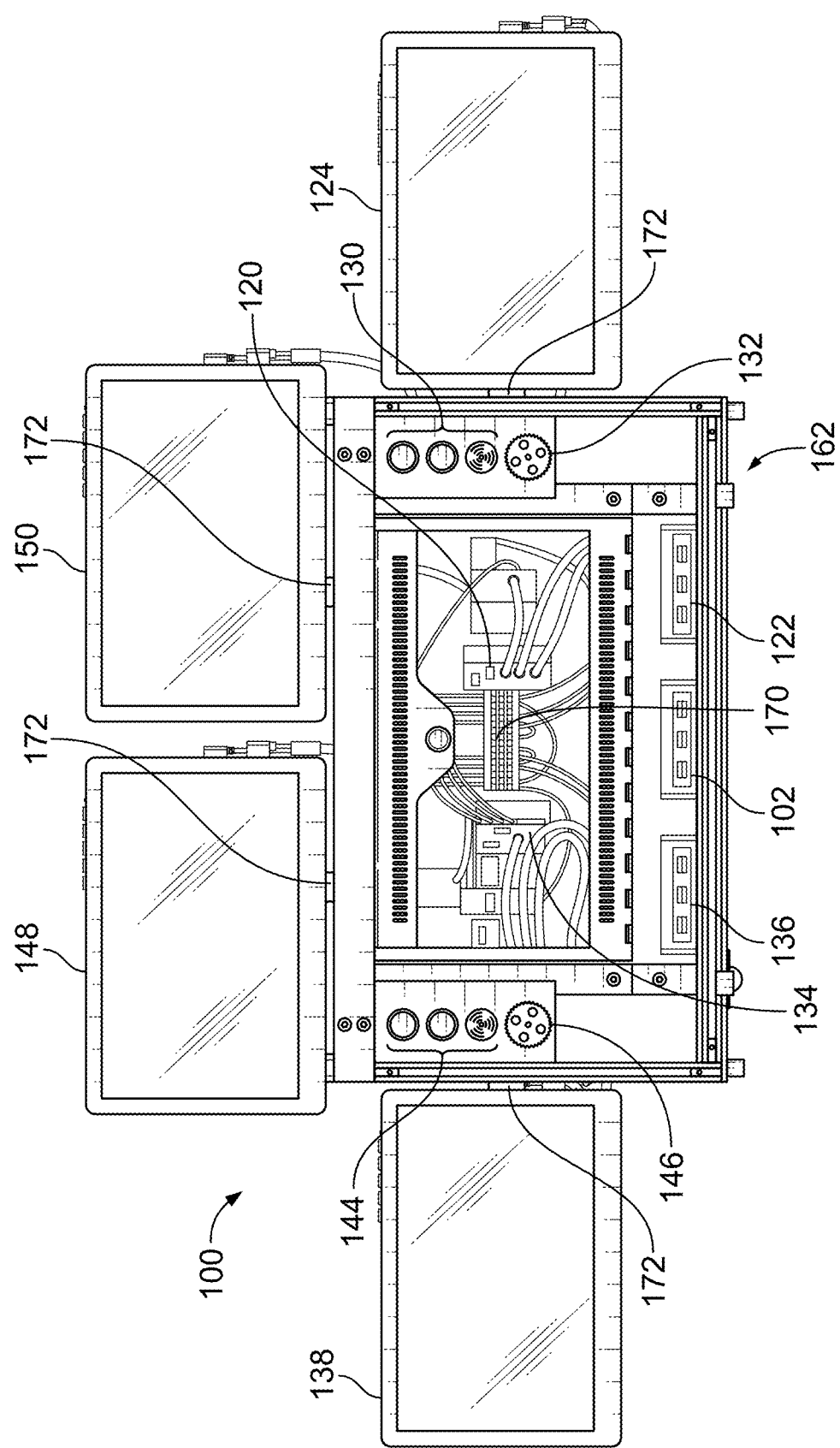
FIG. 3 shows a front view of an industrial operations network, in which the hardware described with respect to FIG. 2 can be seen from a different perspective.

FIG. 3 is a front view of the industrial operations network 100, in which the hardware described above with respect to FIG. 2 can be seen from a different perspective. Visible in the gaps between the displays and the frame 162 are display mount arms 172, which sit on hinges and allow the displays to be alternated between stowed and deployed positions.

FIG. 4 is a perspective view of an industrial operations network 100 showing the network 100 collapsed for portability, with the displays in a stowed position. The handles 172 allow the network to be easily carried to training sites or other sites. Using apparatus and systems according to some embodiments of the present invention, a factory system is fit into a portable, foldable form factor that can be easily and quickly deployed for a conference room setting demonstration. In one embodiment of the present invention, the industrial operations network 100 in its undeployed state as shown in FIG. 4 has a width of approximately 24.74 inches, a height of approximately 14 inches, and a depth of approximately 16 inches.

Figure 5:
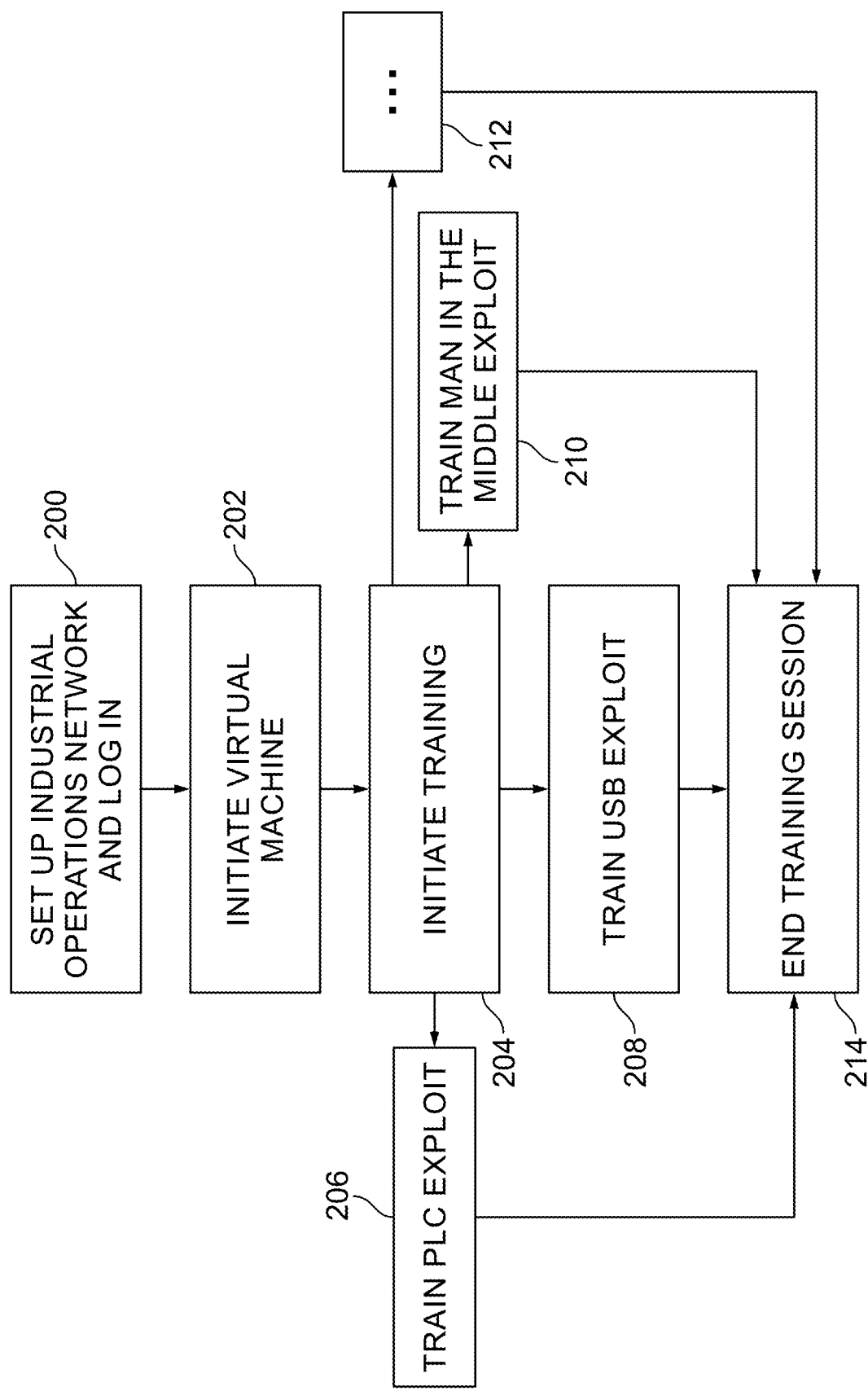
FIG. 5 shows a flow chart showing a number of training functions that industrial operations networks may perform enabled by the present disclosure.

FIG. 5 is a flow chart showing a number of training functions that industrial operations networks 100 according to the present invention can accomplish. These steps may be accomplished by a trainer, in combination with functionality provided by an industrial operations network 100.

At a first step as shown at block 200, the industrial operations network 100 is set up. This step may include deploying the displays of the industrial operations network 100, plugging a power cord of the industrial operations network 100 into a power outlet, and turning on the power switches for hardware such as the displays and the PCs 102, 122, and 136 of the industrial operations network 100. In some embodiments, the displays may be disconnected from other hardware during transit while in the stowed position, and the displays can be connected at this stage if necessary. The trainer may log in to the PCs as part of this setup step, and complete powering-on of the hardware of the industrial operations network 100 if necessary. The industrial operations network 100 may be transported with all of its powered hardware turned on so that only one power switch needs to be turned on at this stage.

Next, as shown at block 200, the trainer initiates the virtual machine on the central PC 102. The virtual machine allows authorized users to access to the industrial operations network 100. Training is then initiated as shown at block 204.

Systems and methods of the present invention may be used to train trainees on a variety of different security exploits and other security concepts and problems of the industrial operations network 100. Trainees may also be trained on the normal operation of the industrial operations network 100. In the embodiment shown in FIG. 5, the trainer is given the option to train on PLC exploits as shown at block 206, train on USB exploits as shown at block 208, or train on man in the middle exploits as shown at block 210. Block 212 indicates that other exploits or security concepts may be trained, or that normal operation examples may be trained as well. The trainer may choose to train on each of these in any order, or may train on any number of these, depending on the needs of the trainees.

During training, the central displays 148 and 150 may be used to display concepts relating to network security and readouts regarding the status of the industrial operations network 100. Unsegmented display 124 displays output from the unsegmented PC 122, and segmented display displays output from the segmented PC 136. Various elements of the hardware, including the lights and buzzer towers 130 and 144 and the motors 132 and 146 can be used to show security fault conditions or errors of the industrial operations network 100 during training and operation.

Examples of training on each of the concepts shown in FIG. 5 will now be discussed.

PLC Exploit

To demonstrate a PLC exploit, the trainer may use a remote access laptop 160 (as shown in FIG. 1) in communication with the industrial operations network 100. The trainer talks through the process of gaining access to the human machine interface (HMI) of the industrial operations network 100 and discusses how a hacker would identify devices on the network and look for specific vulnerabilities of those devices. For example, if a hacker finds one type of PLC on a network, the hacker can assume there are many more identical or similar PLCs depending on the size of the environment.

The trainer gains access using the remote access laptop 160 to the PLCs 120 and 134 via remote desktop to the virtual machine 156, accessed via the wireless access point 158. The trainer places both PLCs 120 and 134 into a normal operating state, where a Green LED is ON, buzzer is OFF, and Red LED is OFF on the lights and buzzer towers 130 and 144, and the motors 132 and 146 are continuously running. By using a terminal command prompt such as Xterm, the trainer can call programs, such as Python programs, to run that target each PLC 120 and 134. Several Python programs that run tell the PLCs 120 and 134 to perform in different ways. One program, a "hack" Python program in one embodiment, sends a command to both of the PLCs 120 and 134, but it only affects the unsegmented PLC 120 and not the segmented PLC 134 because the unsegmented PLC 120 has a vulnerability that the segmented PLC 134 does not have.

The commands can control the PLC to demonstrate effects as follows on the lights and buzzer towers 130 and 144 and the motors 132 and 146:

Normal "Segmented PLC run mode" of the PLC: red light off, green light on, buzzer off, motor running normally.

"Segmented PLC stop mode" of the PLC: red light off, green light on, buzzer off, motor stopped.

"Hacked mode" of the PLC: red light on, green light off, buzzer on, motor running and stopping every two seconds.

An "Unhacked mode" command results in: red light off, green light on, buzzer off, motor stopped.

An "Unsegmented PLC run mode" command will result in: red light off, green light on, buzzer off, motor running normally.

An "Unsegmented PLC stop mode" command will result in: red light off, green light on, buzzer off, motor stopped.

By running through these commands, the trainer demonstrates how the segmented portion 104 of the industrial operations network 100 does not allow the commands to execute and further demonstrates how the unsegmented portion 108 of the industrial operations network 100 does allow these commands to execute at the unsegmented PLC 120, with potentially disastrous consequences.

USB Exploit

The industrial operations network 100 can be used to train on USB exploits, a type of exploit in which a USB device such as a flash memory drive containing malicious code is caused to be inserted into a targeted PC, thereby giving improper access to information, network assets, and/or network functionality.

One way of addressing a USB exploit is to use whitelisting, in which a PC is configured to access and run executables on a USB device only if the USB device is on a "whitelist," which is a list of known and allowed USB devices.

To train on a USB exploit, the trainer inserts a USB device (such as a memory stick) into a USB socket on the segmented PC 134. In this example the segmented PC 134 has a whitelisting function. The USB device contains malicious code and is not whitelisted on the segmented PC 134. Thus, while the segmented PC 134 will detect the USB device (and this detection will be shown on the display 138), it will not run any executable on the USB device.

The trainer then takes the same USB device and inserts it into a USB socket on the unsegmented PC 134. As the unsegmented PC 134 does not have a whitelist that excludes the USB device, executables on the USB device will run on the unsegmented PC 134, which may include the installation of viruses or other malicious code that could give improper access to the functionality of the unsegmented PLC 120. This installation process may be shown on the display 124, though in some USB exploits the installation is not visible on any display.

Man in the Middle Exploit

In a man in the middle exploit, a hacker puts themselves in a position to see and potentially change information as it is transmitted in a network. This can be accomplished by the use of malicious code in which a hacker gains visibility to communications that appear to be secure, and in some cases can change information as it is input. One use of a man in the middle exploits is to see and change passwords so that access can be gained to confidential information.

To train on a man in the middle exploit, the trainer can begin by starting a network analysis application, such as the Wireshark packet analyzer, on the central PC 102. This application will monitor the traffic between the central PC 102 and the unsegmented PC 122, and in particular it may monitor traffic on an Ethernet network card of the central PC 102 that is connected to the unsegmented PC 122.

Next, software such as "FTPd" software is used to create an FTP account on the central PC 102, to share files over the network 100. Because FTP is an unencrypted protocol, other software used for monitoring network activity can capture password information used to log into the FTP account. A trainee can be called to insert a password into the application. The unsegmented PC 122 is then used to open a file explorer program (such as Windows Explorer) and browses to the FTP host at the central PC 102, and the trainee inserts the password to gain access to information such as financial information. The trainer can then demonstrate to the trainees that the Wireshark packet analyzer allows capture of the password in this step because there was a "man in the middle" and the password was transmitted in an unencrypted form via FTP. The trainees can be informed that the use of unencrypted communications for secure information on control networks leaves apparently secure information open to inspection and exploitation.

Elements of the hardware in the industrial operations network may be provided with IP addresses, just as they would be addressed in a factory deployment, and these IP addresses are used during the training process to identify and access hardware components as needed.

The methods and systems discussed herein may be implemented via one or more processing devices (e.g., a digital processor, a digital circuit designed to process information, an analog circuit designed to process information, a state machine, and/or other mechanisms for electronically processing information). The one or more processing devices may include one or more devices executing some or all of the operations of the methods in response to instructions stored electronically on an electronic storage medium. The one or more processing devices may include one or more devices executing some or all of the operations of the methods in response to instructions stored electronically on an electronic storage medium. The one or more processing devices may include one or more devices configured through hardware, firmware, and/or software to be specifically designed for execution of one or more of the operations of the methods.

The servers, client computing platform(s), and any other discussed third parties may be communicatively linked via one or more electronic communication links. In some embodiments, such electronic communication links may be established, at least in part, via a network such as the Internet and/or other networks. It will be appreciated that this is not intended to be limiting, and that the scope of this disclosure includes implementations in which servers, client computing platform(s), and any other discussed third parties may be operatively linked via some other communication media.

A given client computing platform may include one or more processors configured to execute computer program modules. The computer program modules may be configured to enable a user associated with the given client computing platform to interface with the described systems and methods and/or provide other functionality attributed herein to client computing platform(s). By way of non-limiting example, the given client computing platform may include one or more of a desktop computer, a laptop computer, a handheld computer, a tablet computing platform, a Smartphone, a gaming console, a VR/AR headset or other device, and/or other computing platforms.

Systems for use in some embodiments of the present invention may incorporate or communicate with one or more servers to complete or facilitate certain functions. Servers and/or PCs may include electronic storage and one or more processors, and/or other components. Servers may include communication lines, or ports to enable the exchange of information with a Network and/or other computing platforms. Illustration of servers is not intended to be limiting. Servers may include a plurality of hardware, software, and/or firmware components operating together to provide the functionality attributed herein to servicer(s). For example, servers may be implemented by a cloud of computing platforms operating together as servers.

Electronic storage as used with some embodiments of the present invention may comprise non-transitory storage media that electronically stores information. The electronic storage media may include one or both of system storage that is provided integrally (i.e., substantially non-removable) with servers and/or removable storage that is removably connectable to servers via, for example, a port (e.g., a USB port, a firewire port, etc. (or a drive (e.g., a disk drive, etc.)). The electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage may include one or more virtual storage resources (e.g., cloud storage, a virtual private Network, and/or other virtual storage resources). The electronic storage may store software algorithms, information determined by processor(s), information received from servers, information received from client computing platform(s), databases and/or other information that enables servers to function as described herein.

Processor(s) may be configured to provide information processing capabilities in servers. As such, processor(s) may include one or more of a digital processor, an analog processor, a digital circuit designed to process information, an analog circuit designed to process information, a state machine, and/or other mechanisms for electronically processing information. Although processor(s) may function as a single entity, in other implementations, processor(s) may include a plurality of processing units. These processing units may be physically located within the same device, or processor(s) may represent processing functionality of a plurality of devices operating in coordination. Processor(s) may be configured to execute instructions for applications, or modules, by software; hardware; firmware; some combination of software, hardware, and/or firmware; and/or other mechanisms for configuring processing capabilities on processor(s). As used herein, the term "module" may refer to any component or set of components that perform the functionality attributed to the module. This may include one or more physical processors during execution of processor readable instructions, the processor readable instructions, circuitry, hardware, storage media, or any other components.

The various messaging and data transfer described above can be accomplished with a REST API (or "RESTful" API). A RESTful API is an application program interface (API) that uses HTTP calls to request resources as opposed to functions. The function is embedded in the HTTP call through requests to GET, PUT, POST and DELETE, for example. The API spells out the proper way to request data, from an operating system or other application and allows management of customer data, sales orders, inventory, and products.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirt and scope of the appended claims. For example. It is to be understood that the present technology contemplates that, to the extent possible, one or more features of any implementation can be combined with one or more features of any other implementation.

What is claimed is:

1. An apparatus for training industrial security concepts comprising:
    a portable industrial operations network comprising:
    at least one router;
    at least one firewall;
    at least one programmable logic controller;
    at least one display connected to the portable industrial operations network, said at least one display adapted to display, at different times, normal operating conditions of said portable industrial operations network and security fault conditions in said portable industrial operations network;
    a frame in which the at least one router, the at least one firewall, the at least one programmable logic controller, and the at least one display are disposed; and
    at least one computing device disposed within the frame and coupled to the at least one firewall, the at least one router, the at least one programmable logic controller, and the at least one display.

2. The apparatus of claim 1 further comprising:
    at least one hinge to which the at least one display is mounted to said frame, said at least one hinge allowing the at least one display to be deployed from a stowed position to a displayed position.

3. The apparatus of claim 2 wherein the at least one display is configured to be deployed manually or automatically.

4. The apparatus of claim 1 further comprising:
    at least one physical indicator for demonstrating a difference between proper run conditions of the industrial operations network and a security fault condition of the industrial operations network in response to signals received from the industrial operations network.

5. The apparatus of claim 1 further comprising:
    at least one audible alarm for sounding an alarm in response to a security fault condition in the industrial environment.

6. The apparatus of claim 1 wherein the portable industrial operations network is divided into a segmented and an unsegmented section, the segmented section being connected to the router via the firewall and the unsegmented section being connected to the router without any intervening firewall.

7. The apparatus of claim 1 further comprising a network access point whereby the apparatus may communicate with a remote access device via which an instructor may provide instructions to the apparatus.

8. A method for training security concepts and practices in industrial operations networks comprising:
    providing a portable industrial operations network comprising at least one router, at least one firewall, at least one programmable logic controller, at least one display connected to the portable industrial operations network, said at least one display adapted to display, at different times, normal operating conditions of said portable industrial operations network and security fault conditions in said portable industrial operations network, at least one computing device, and a frame in which the at least one router, the at least one firewall, the at least one programmable logic controller, the at least one display, and the at least one computing device are disposed; and
    executing training programs using said portable industrial operations network to conduct a training program demonstrating at least one security exploit occurring on the portable industrial operations network.

9. The method of claim 8 wherein the at least one security exploit comprises a programmable logic controller exploit.

10. The method of claim 8 wherein the at least one computing device has a USB socket, and wherein the at least one security exploit comprises a USB exploit.

11. The method of claim 8 wherein the at least one security exploit comprises a man in the middle exploit making visible information provided via the at least one computing device.

12. The method of claim 8 wherein providing a portable industrial operations network further comprises altering said at least one display of said industrial operations network from a stowed position to a deployed position via a hinged mount of said industrial operations network in which said at least one display is configured to be visible by one or more trainees in the deployed position.

13. A system for training industrial security concepts comprising:
    a portable industrial operations network comprising:
    at least one router;
    at least one firewall;
    at least one programmable logic controller;
    at least one display connected to the portable industrial operations network, said at least one display adapted to display, at different times, normal operating conditions of said portable industrial operations network and security fault conditions in said portable industrial operations network;
    a frame in which the at least one router, at least one firewall, at least one programmable logic controller, and at least one display are disposed; and
    at least one hinge to which the at least one display is mounted to said frame, said at least one hinge allowing the at least one display to be deployed from a stowed position to a displayed position; and
    a virtual machine operable to provide a user access to the portable industrial operations network.

14. The system of claim 13 wherein the at least one display is configured to be deployed manually or automatically.

15. The system of claim 13 further comprising:
at least one physical indicator for demonstrating a difference between proper run conditions of the industrial operations network and a security fault condition of the industrial operations network in response to signals received from the industrial operations network.

16. The system of claim 13 further comprising:
at least one audible alarm for sounding an alarm in response to a security fault condition in the industrial environment.

17. The system of claim 13 further comprising:
at least one computing device disposed within the frame and coupled to the at least one firewall, the at least one router, and the at least one display, wherein the at least one computing device is operable by the user to initiate the virtual machine.

18. The system of claim 13 wherein the portable industrial operations network is divided into a segmented and an unsegmented section, the segmented section being connected to the router via the firewall and the unsegmented section being connected to the router without any intervening firewall.

* * * * *